Figure 1:
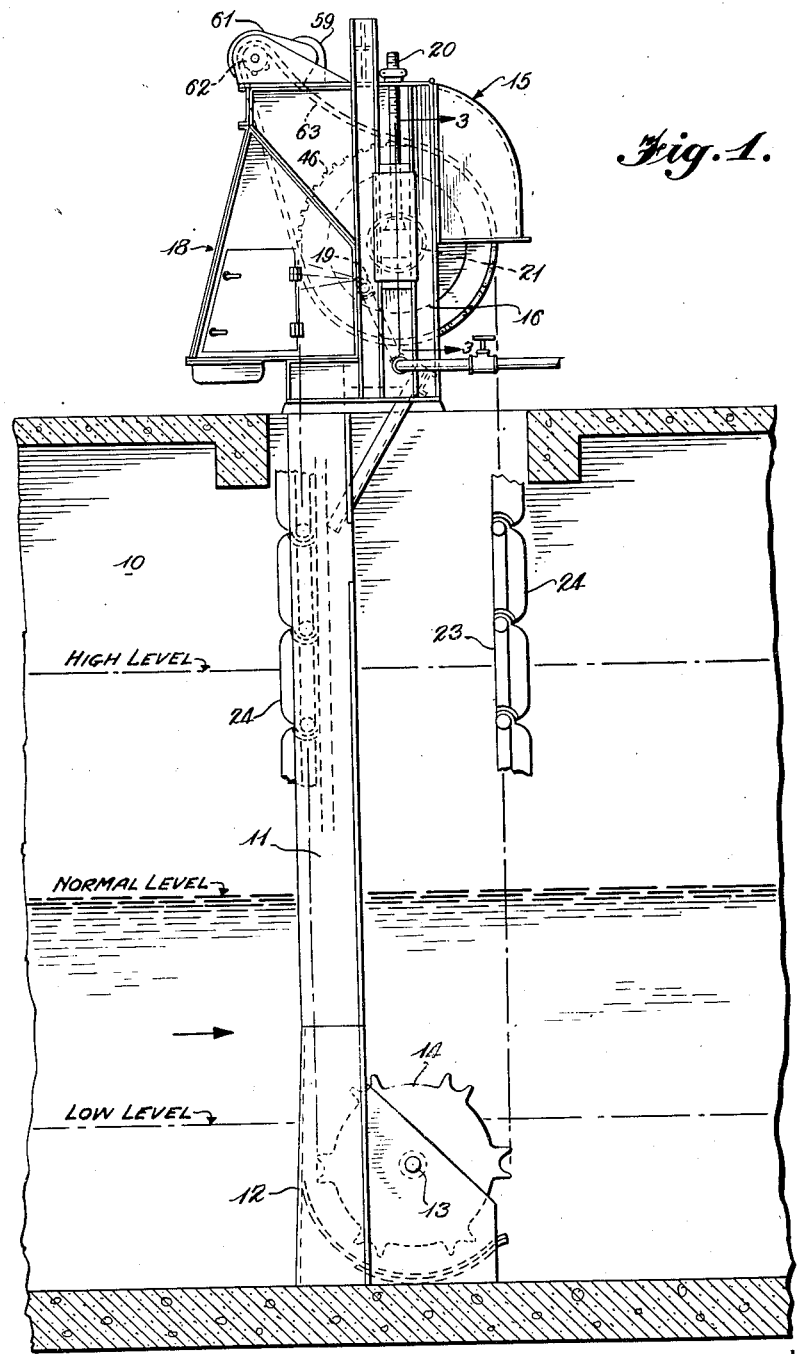

Oct. 10, 1950     R. F. BERGMANN ET AL     2,525,516
TRAVELING WATER INTAKE SCREEN
Filed April 18, 1946                           5 Sheets-Sheet 3
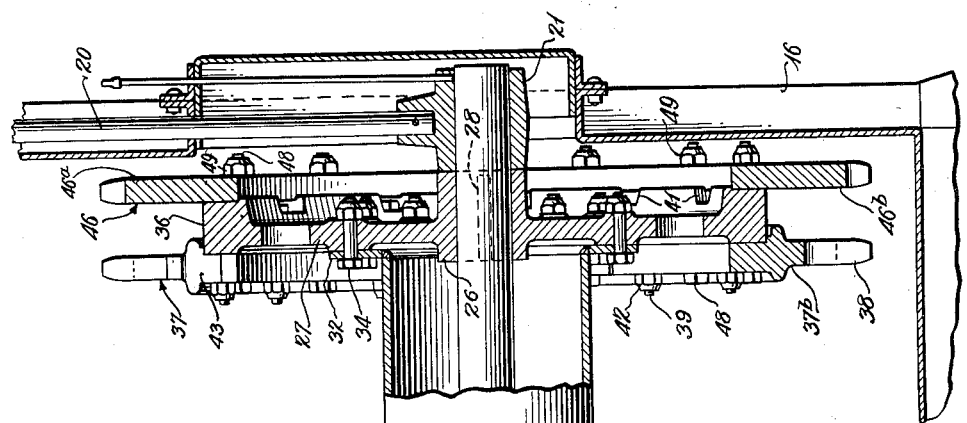
Fig. 3.
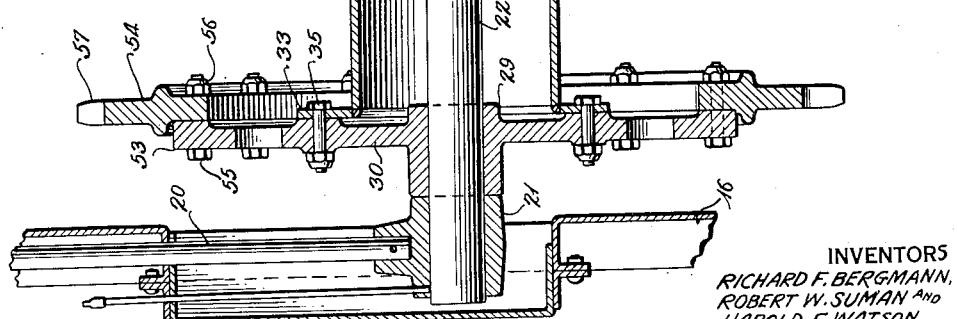
INVENTORS
RICHARD F. BERGMANN,
ROBERT W. SUMAN AND
HAROLD F. WATSON
BY
L. Donald Myers
ATTORNEY Oct. 10, 1950    R. F. BERGMANN ET AL    2,525,516
TRAVELING WATER INTAKE SCREEN Filed April 18, 1946    5 Sheets-Sheet 4

INVENTORS
RICHARD F. BERGMANN,
ROBERT W. SUMAN AND
HAROLD F. WATSON
BY L. Donald Myers
ATTORNEY Oct. 10, 1950  R. F. BERGMANN ET AL  2,525,516
TRAVELING WATER INTAKE SCREEN
Filed April 18, 1946  5 Sheets-Sheet 5

INVENTORS
RICHARD F. BERGMANN,
ROBERT W. SUMAN AND
HAROLD F. WATSON
BY
ATTORNEY

Patented Oct. 10, 1950

2,525,516

UNITED STATES PATENT OFFICE 2,525,516

TRAVELING WATER INTAKE SCREEN

Richard F. Bergmann, Winnetka, and Robert W. Suman, Chicago, Ill., and Harold F. Watson, Philadelphia, Pa., assignors to Link-Belt Company, a corporation of Illinois Application April 18, 1946, Serial No. 663,120

20 Claims. (Cl. 74—243)

This invention relates to new and useful improvements in traveling water intake screens.

Traveling water intake screens are employed for removing oversized pieces of refuse and various types of solids from the raw water at the intakes of municipal filtration plants and pumping stations as well as industrial plants processing such materials as paper, rubber, steel, and the like.

No successful attempt ever has been made to standardize drives for traveling water intake screens because of the relatively large number of variables and operating conditions that are encountered at the different plants or stations where installations are made. Consequently, manufacturers have not been able to produce in quantities and stock parts for a reasonable number of different sized standard drive assemblies or sub-assemblies. This lack of standardization has made original installations, and the replacement of worn out or damaged parts, either expensive for the purchasers or relatively unprofitable for the manufacturers, and has delayed the obtaining of repair and replacement parts by users.

It is one of the primary objects of this invention to provide a standardized drive mechanism for traveling water intake screens which is of such a construction that the parts required for a full range of different horsepowered drive assemblies and sub-assemblies may be manufactured in quantities and stocked in anticipation of future sales.

The traveling water intake screens installed at different plants and stations vary in width from approximately two feet to as much as ten feet and in height from approximately fifteen feet to as much as one hundred feet. The normal loss in head between the raw water side and the clean water side of a screen usually is in the neighborhood of two or three inches. However, as a result of an abnormal accumulation of refuse on the screen surface, the loss in head may be measured in feet. The difference between the low water level and the high water level in the water channel supplying the screen, naturally, depends on conditions prevailing at the source of supply of the raw water. Differences as high as fifteen to twenty feet are encountered at some localities during flood seasons. Logs or other floating objects occasionally jam the screen and impose an abnormal load on the traveling screen structure. This load can be applied almost entirely to either one of the two screen chains employed for carrying the screen trays. The above are some of the variables or different operating conditions that render so difficult the problem of designing a standard form of drive mechanism for traveling water intake screens.

It has been the prior practice to take care of the variations in screen dimensions by employing different diametered head shafts and/or by driving the head shaft either at one end or at both ends. Consequently, a large number of different diametered and lengthened shafts are required and different dimensioned screen chain and drive chain sprocket wheels must be provided for each different diametered shaft. The variations that will be encountered in providing drives for one and/or both ends of the head shaft should be obvious without enumeration.

Another primary object of the invention is to standardize on driving one end of the head shaft and on employing a given shaft diameter for the full range of different sized screens by using a torque tube in addition to the head shaft for supporting and driving the screen chain sprockets. This torque tube functions to reduce torsional deflection between the conveyor chain sprockets to a negligible amount and eliminates all torsional shear or deflection from the head shaft itself.

Other prior practices have been to mount the head shaft in bearings carried by the opposite sides of the head frame, mounting the screen chain sprocket wheels on the shaft inwardly of the bearings, and mounting the drive chain sprocket wheel or wheels on the shaft outwardly of the bearings. This outboard location of the drive chain sprocket wheels facilitated replacement of these wheels when worn out but resulted in imposing high stresses on the hubs of the conveyor chain sprocket wheels because of applying the sprocket rotating forces at such a short distance from the axis of the shaft.

A further primary object of the invention is to provide a novel form of combined screen chain and drive chain sprocket construction at the drive end of the head shaft which will permit the drive sprocket to be located inboard of its associated shaft supporting bearing; which will permit either the driving chain sprocket or the screen chain sprocket to be replaced when worn without cutting its chain, and which will effect application of the forces rotating the screen chain sprockets at such a distance from the shaft axis that the high stresses normally encountered at the hubs of the screen chain sprockets will be eliminated.

Traveling water intake screens usually are operated automatically at predetermined intervals, or intermediately under manual control, as often as is found necessary by an attendant. Two or three complete revolutions of the screen usually are all that are necessary to cause the screen trays to come up clean. This cycle may have to be repeated as often as every half hour, or only two or three operations within a twenty-four hour period may be all that are necessary, depending upon the requirements of each particular installation.

With the movable screen mechanism properly balanced and operating with the normal amount of refuse and with a loss of head of only two or three inches, the power required to turn over the screen is very small because it merely has to overcome the load of the refuse being elevated plus the friction developed in the screen mechanism resulting from the pressure of the loss of head against the screen. There are occasions, however, when refuse accumulates very rapidly on the screening surface, causing the loss in head to increase to several feet, and the power requirements to mount to from ten to twenty times normal.

Good engineering requires that a definite limit, for example sixty inches, be established for the maximum loss in head; that all parts of the drive mechanism and screen structure be designed to withstand without damage the stresses and strains that will result from such a maximum head, and that travel of the movable screen mechanism will not take place when said limit is exceeded. It has been the prior practice, therefore, to provide a drive mechanism that includes a prime mover which will develop the horsepower required to operate the traveling screen mechanism when the latter is subjected to the maximum head and to provide a shear pin, at a suitable location in the drive, which will break and stop the application of power to the traveling screen mechanism when the established limit is exceeded.

The traveling screen mechanism can become jammed by a log, or other floating object, while operating with a loss in head that is less than the established maximum. If the screen mechanism cannot free itself of the jam with the pull developed by the extra horsepower that is provided to take care of the loss in head up to the described maximum, the shear pin will break and the application of power to the screen mechanism will stop. It then becomes necessary for a diver to go down in the water channel or well, in which the screen is located, to remove the obstructing object. A mechanic, also, will be required to replace the broken shear pin. After the obstruction has been removed and the shear pin has been relaced, the screen mechanism again can be operated.

Still another primary object of the invention is to provide a drive mechanism for traveling water intake screens which includes a traction-type fluid coupling, located at a suitable point in the line of drive transmission between the electric motor, employed as a prime mover, and the head shaft of the screen mechanism, that will function to limit the application of power to the traveling screen mechanism to that which is required to operate the screen mechanism until the maximum loss of head is reached, but will provide for a 100% slippage when said load limit is exceeded, and, through the medium of a standard thermal overload release starter switch for the motor, will open the electric circuit to the motor after the full load torque developed by the motor has been applied to the screen mechanism for a brief interval, such as for thirty to ninety seconds. This prolonged application of the full load torque to the screen mechanism will result in freeing the screen mechanism of a high percentage of the jams that would have caused breakage of shear pins, if such pins had been employed.

Other objects and advantages of the invention will be apparent during the course of the following description.

Figure 2:
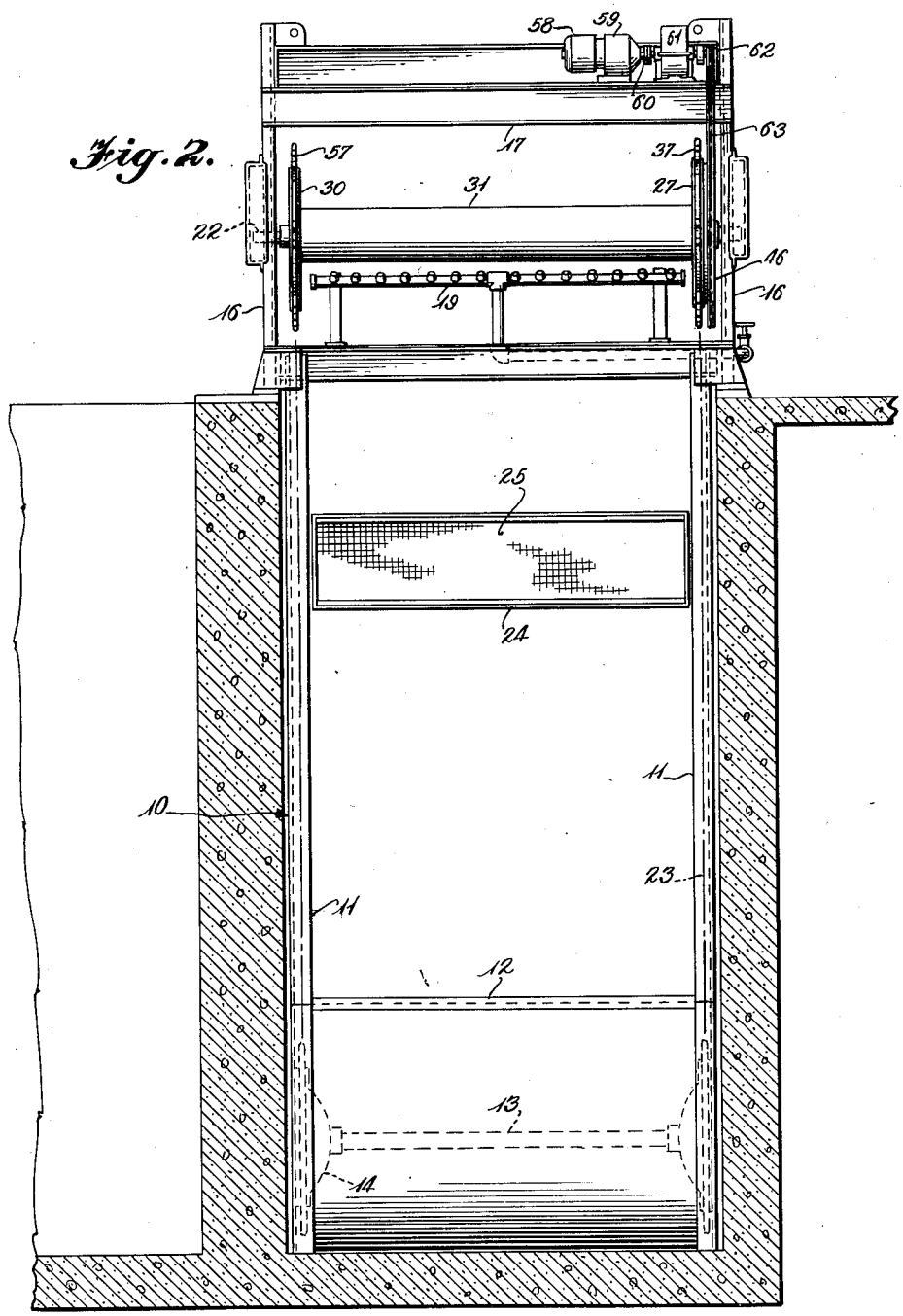
Figure 4:
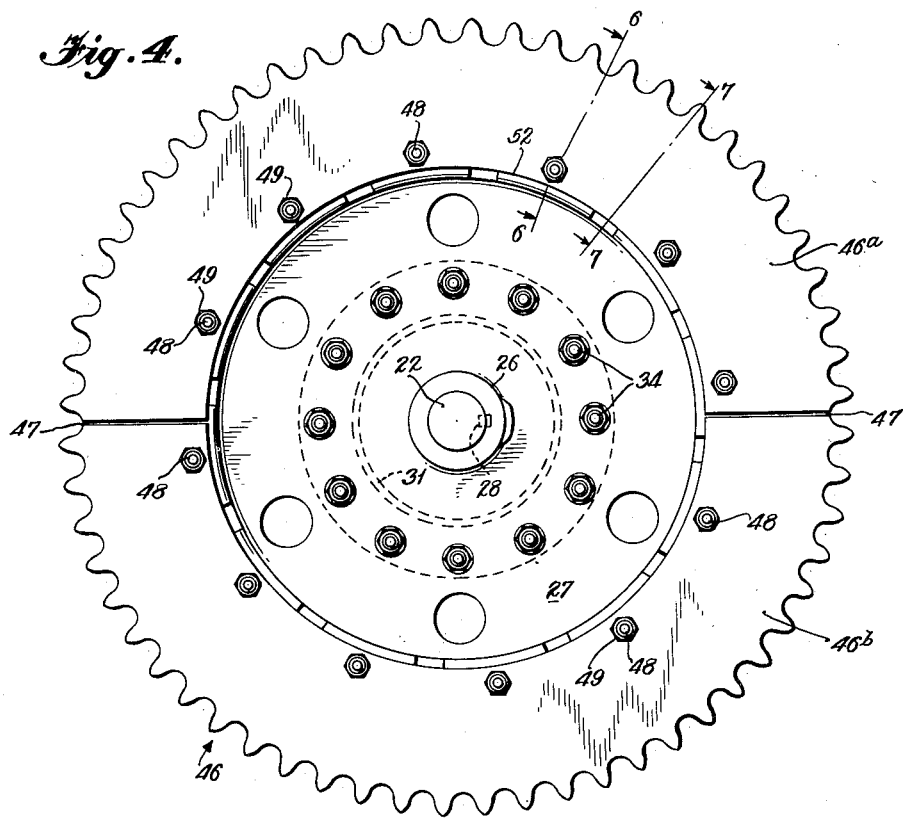
Figure 6:
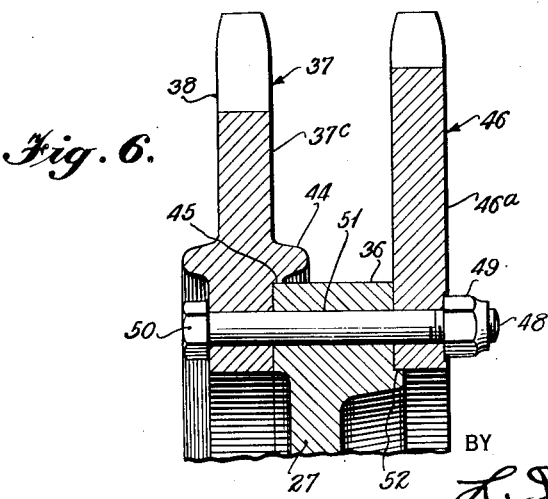
Figure 5:
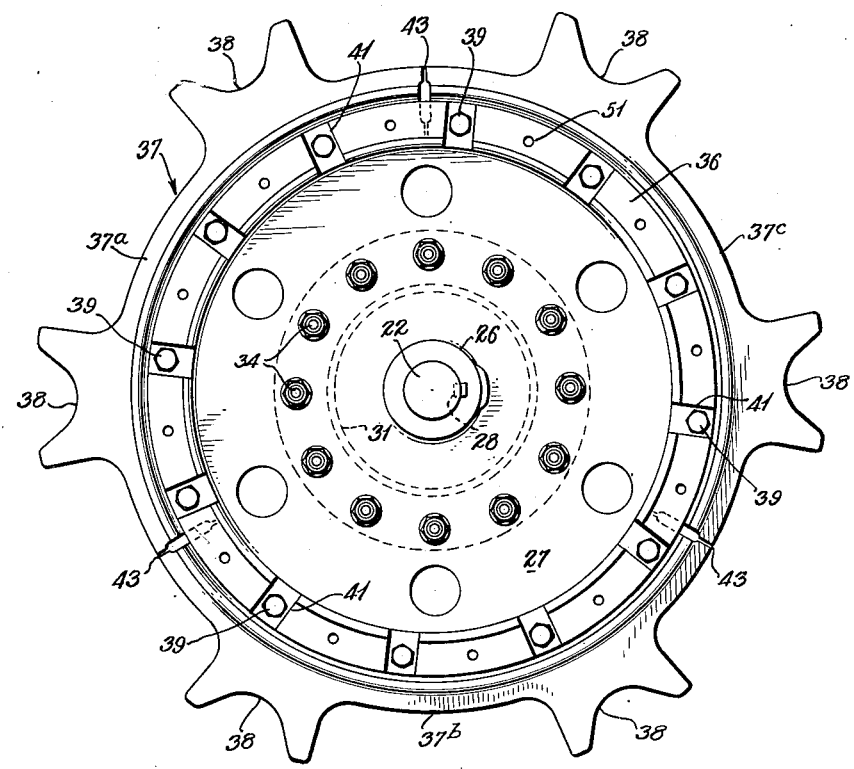
Figure 7:
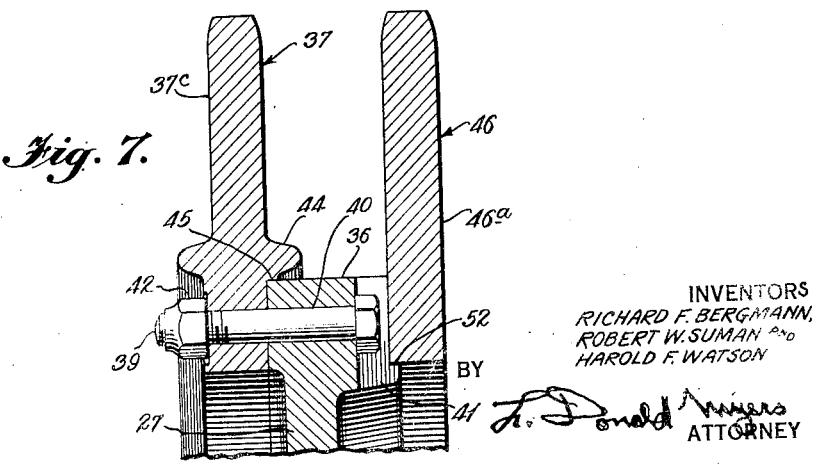

In the accompanying drawings forming a part of this specification and in which like numerals are employed to designate like parts throughout the same:

Figure 1 is a side elevational view, partly broken away, of a traveling water intake screen embodying this invention, Figure 2 is a front elevational view of the screen illustrated in Fig. 1, Figure 3 is an enlarged, vertical sectional view taken on line 3—3 of Fig. 1, Figure 4 is a detail side elevational view of a combined screen chain and drive chain sprocket when viewed from the drive chain sprocket side, Figure 5 is a similar view to Fig. 4 but illustrates the sprocket mechanism with the drive chain sprocket rim removed to partly illustrate the screen chain sprocket rim assembly, Figure 6 is a detail fragmentary sectional view taken on line 6—6 of Fig. 4, and Figure 7 is a similar view to Fig. 6 but taken on line 7—7 of Fig. 4.

In the drawings, wherein for the purpose of illustration is shown the preferred embodiment of this invention, and first particularly referring to Fig. 1, the reference character 10 designates in its entirety the water channel or well in which the traveling water intake screen is located to effect the removal of oversized pieces of refuse and various types of solids from the water flowing through the channel.

The screen mechanism includes a supporting frame that consists of the parallel uprights 11 arranged in the channel or well 10 and which are connected to the boot portion 12 that is located at the bottom of the channel or well and which functions to protect the foot shaft 13 and foot sprocket wheels 14 for the screen chains. In other words, this boot 12 is intended to prevent floating objects, such as logs or the like, from damaging the mechanism of the intake screen that is located at the bottom of the channel or well 10 and which also functions to eliminate to a considerable extent the jamming of the intake screen at its lower end. The screen frame also includes the head portion 15 that consists of the parallel side frame members 16 and the cross frame members 17 that extend between the upper ends of the side frame members to provide a platform for supporting certain drive mechanism that will be described in detail at a later point.

A sheet metal housing, of any desired construction, is designated at 18 and functions to enclose the head shaft and its associated sprocket elements as well as the spray nozzles 19 which function in the conventional manner to remove the refuse from the screen trays, and their associated screening cloths, as the trays are moved past the nozzles. The refuse that is removed by the streams or jets of water discharged by the nozzles 19 is carried off in any desired manner by suitable conveyor mechanism, not shown.

For a more detailed disclosure of a conventional form of traveling water intake screen, reference may be made to Patent No. 1,910,860, issued to William W. Sayers, on May 23, 1933.

Referring to Figs. 1 and 3, it will be seen that the side frame members have mounted thereon suitable take-up mechanisms 20 which are employed for vertically adjustably supporting the bearings 21 which journal the end portions of the head shaft 22.

The water screen comprises two endless screen chains 23 which are caused to travel two closed paths by means of the foot sprocket wheels 14 and the screen chain sprocket wheels which will be described in detail at a later point. These screen chains have connected thereto, in each pitch thereof, the trays 24. One of these trays is illustrated in Fig. 2 as being provided with a screen cloth 25. It is to be understood that each one of the trays carries such a screening surface.

Referring more particularly to Figs. 2 and 3, it will be noted that the head shaft 22 has the hub portion 26 of a center disc 27 fastened to the head shaft by the key 28. This center disc 27, therefore, will be caused to rotate with the head shaft 22. Fig. 3 discloses the hub 26 as being positioned in close proximity to and inboard of the bearing 21 that supports the adjacent end of the shaft.

Fig. 3 also discloses the hub 29 of a second center disc 30 as being journaled on the remaining end portion of the head shaft 22 just inwardly of the bearing 21 that supports this shaft end. The hub 29 is loosely mounted on the head shaft 22, or is not keyed to this shaft. It will be appreciated, therefore, that the head shaft functions to support and accurately line up the two center discs 27 and 30 and their hubs 26 and 29 respectively.

Enclosing and concentrically positioned with respect to the portion of the head shaft 22 that is located between the center discs 27 and 30 is a torque tube 31. This torque tube is cut from a piece of tubular stock and has end flanges 32 and 33 welded to its opposite ends. These end flanges are employed for attaching the opposite ends of the torque tube to the center discs 27 and 30. A suitable number of fastening devices, such as bolts and nuts 34 and 35, are employed for effecting this attachment of the torque tube to the two center discs. It will be appreciated, therefore, that the drive connection between the two center discs 27 and 30 is established through the torque tube 31 instead of through the head shaft 22.

Referring specifically to Figs. 3 and 5 to 7 inclusive, it will be noted that the peripheral portion of the center disc 27 is enlarged at 36 to provide a felly. To the inner side face of this felly, there is detachably secured the screen chain sprocket rim 37. Fig. 5 illustrates this rim as being formed of three identically constructed rim parts or sections 37a, 37b and 37c. It will be noted that each one of these sections is provided with two teeth 38 that are shaped to receive the rollers of the screen chain that is to be trained thereover.

Fig. 5 illustrates a total of twelve bolts 39 which are employed for directly attaching the three parts or sections of the screen chain sprocket rim to the center disc 27. It will be noted that these bolts are equally spaced circumferentially around the center disc 27 and pass through axial openings 40 formed in the felly 36 of the disc. Figs. 3, 5 and 7 illustrate the opposite side of the felly 36 as being notched or grooved at 41 to accommodate the heads of the bolts 39. That is to say, the heads of these bolts are positioned in the notches or grooves 41 so that their outer end faces are set inwardly of the aforesaid side surface of the felly 36. Each one of these bolts 39 is provided with a nut 42 that bears against the adjacent portion of its sprocket rim part or section to fasten this part or section to the felly of the center disc. Fig. 5 illustrates the fact that the chain sprocket rim is divided into the three equally sized rim parts or sections at the three division points that are identified by the reference character 43. These three division points, therefore, are located 120° apart. This figure also discloses the fact that four of the nut and bolt fastening devices 39—42 are employed for each one of the screen chain sprocket rim parts or sections.

Figs. 3, 6 and 7 clearly illustrate each one of the screen chain sprocket rim parts or sections as being provided with an aixal rib portion 44 that functions to provide a shoulder 45 which bears directly against the peripheral surface of the center disc felly 36. It will be appreciated, therefore, that these ribs 44, with their shoulders 45, function to properly position the rim parts or sections with respect to the center disc 27 and also assist in supporting the load imposed on the sprocket rim parts or sections by the screen chain that is trained over the rim.

Figs. 3, 4, 6 and 7 illustrate the center disc 27 as having suitably secured thereto the drive chain sprocket rim 46. Fig. 4 illustrates this rim as being divided into two symmetrical, or equally sized, rim parts or sections 46a and 46b. Diametrically opposite division points 47, therefore, are provided between the two halves or parts 46a and 46b of the drive chain sprocket rim.

By considering that Figs. 4 and 5 illustrate the center disc 27 as occupying exactly the same position, it will be appreciated that one of the division points 43 for the three screen chain sprocket rim parts or sections is provided at right angles to, or normal to, the plane that passes through the two division points 47 of the drive chain sprocket rim 46. Consequently, the remaining two division points 43 for the screen chain sprocket rim will be positioned opposite the other half or section of the drive chain sprocket rim.

Fig. 4 illustrates a total of twelve bolts 48 as passing through the drive chain sprocket rim 46 and as having nuts 49 threaded thereon. Fig. 6 specifically illustrates these bolts 48 as passing through the felly 36 of the center disc 27 and the inner portion of the screen chain sprocket rim. The head 50 of each bolt 48, therefore, bears against the outer surface of its associated chain sprocket rim part. Fig. 5 discloses the locations of the openings 51 that are formed in the felly 36 to accommodate the bolts 48. It will be noted that these openings 51 are each positioned intermediate two bolts 39.

Figs. 6 and 7 illustrate the felly as being formed with a shoulder 52 for seating the inner perimeter of the drive chain sprocket rim 46 to assist in supporting this rim and to assure accurate positioning and aligning of the same with respect to the center disc 27.

From the above description, it will be seen that the bolts 48, and their nuts 49, are the only fastening devices which secure the drive chain rim parts or sections to the center disc 27 while all of the bolts 39 and 48, with their nuts 42 and 49 respectively, function to fasten the screen chain sprocket rim parts or sections to the center disc 27. Consequently, to remove the drive chain sprocket rim from the center disc, it is only necessary to detach the nuts 49 from the bolts 48. To remove the screen chain sprocket rim parts 37 from the center disc 27, it is necessary to remove the bolts 48 and to remove the nuts 42 from the bolts 39.

The forming of the drive chain sprocket rim 46 in two parts and the screen chain sprocket rim in three parts, and the arranging of the division points 47 and 43 respectively in the manner illustrated, is to enable either one of the sprocket rims to be replaced without necessitating the cutting of the chain that is trained thereover. This feature will be more completely described as follows.

Considering first the removal of the drive chain sprocket rim, it should be understood that the drive chain is trained around the lower portion of this sprocket rim. Therefore, by positioning the rim in the manner illustrated in Fig. 4, the rim part or section 46a can be detached and a replacement part substituted therefor without interfering with the meshing of the drive chain with the drive sprocket rim teeth. This upwardly positioned rim part or section 46a can be removed by detaching the six nuts 49 from the associated bolts 48. The removal of these nuts 49 from their bolts 48 will in no way disturb the bolts 39 and nuts 42 that are functioning to secure the screen chain rim sections or parts 37a and 37c to the center disc 27. After the replacement drive chain sprocket rim part has been positioned to take the place of the illustrated rim part 46a, the assembly can be rotated 180° to position the drive chain rim part 46b at the location illustrated in Fig. 4 as being occupied by the rim part 46a. In other words, the rim part 46b now will occupy the upper half of the sprocket as illustrated in Fig. 4. The drive chain sprocket rim part 46b then can be replaced in the same manner as has been described with reference to the drive chain rim part 46a.

If it again is considered that Figs. 4 and 5 represent a given position for the head shaft 42 and both the screen chain sprocket rim 37 and the drive chain sprocket rim 46, the screen chain sprocket rim can be replaced, without cutting the screen chain trained over this rim.

With the screen chain sprocket rim occupying the position illustrated in Fig. 5, it will be appreciated that the screen chain will have its rollers meshing with the teeth 38 that are carried by the rim parts or sections 37a and 37c. These rim parts or sections, through their teeth 38, therefore, are supporting the load of the screen chain and its screen trays at the drive side of the screen.

The screen chain sprocket rim part or section 37b now can be removed, and a replacement part positioned, by removing the nuts 42 from the four bolts 39 that pass through this rim part 37b and by completely removing the four lowest bolts 48 that are illustrated in Fig. 4. These four bolts 48, as have been described above, pass through the felly 36 of the center disc 27 and both of the rims 37 and 46. The removal of the said nuts 42 and the said bolts 48 will complete the release of the screen chain rim part 37b. Of course, a replacement part can be substituted and fastened in place by replacing the nuts 42 and the bolts 48. By considering the disclosure of Fig. 4, it will be seen that when the four lowest bolts 48 are completely removed, the two remaining bolts 48 that are located just below the division points 47 still will be functioning to hold in place the drive chain sprocket rim part 46b.

The screen chain rim part 37a can be removed by rotating the head shaft 22 and the center disc 27 with its two rims until the screen chain sprocket rim part 37a occupies the bottom position, or the position previously occupied by the screen chain rim part 37b.

The rim 37a now can be removed, and a replacement part substituted, by removing the nuts 42 for the four bolts 39 that pass through this rim part 37a. It is then necessary to remove the four bolts 48 that pass through this rim part 37a. These four bolts are illustrated in Fig. 4 as consisting of the bolt that is located immediately below the left-hand division point 47 and the three bolts that are located just above this left-hand division point. With these four bolts 48 removed, the drive chain sprocket rim part 46a still will be held in place by three bolts 48 while the drive chain sprocket rim part 46b still will be held in place by five bolts 48.

The remaining screen chain sprocket rim part 37c can be removed, and a replacement part substituted, by turning the head shaft assembly into the position where the rim part 37c occupies the location of the rim part 37b in Fig. 5. The nuts 42 for the four bolts 39, that pass through the rim part 37c, then may be removed. The four bolts 48 that pass through this rim part 37c may be removed to complete the release of the rim part. These four bolts are illustrated in Fig. 4 as consisting of the bolt 48 located immediately below the right-hand division point 47 and the three bolts 48 located just above this division point.

When these four bolts 48 are removed, the drive chain sprocket rim part 46a still will be held in place by the remaining three bolts 48 while the drive chain sprocket rim part 46b will be held in place by five bolts 48.

Fig. 3 illustrates the center disc 30, which is loose on the head shaft 22, as being provided with a felly 53. To the inner side face of this felly there is fastened a multi-part, or sectional, screen chain sprocket rim 54 which is of identical construction to the previously described screen chain sprocket rim 37. The rim 54 is held in place by twelve bolts 55 with their nuts 56. It will be noted that the nuts 56 are positioned on the inner side of the sectional rim 54.

By positioning each one of the parts or sections of the rim 54 at the bottom of the head shaft assembly, or in the position occupied by the part 37b of the rim 37, see Fig. 5, the rim parts or sections of the rim 54 may be removed and replacement parts substituted without cutting the screen chain that is trained over this rim 54.

The rim 54 is provided with teeth 57 which are of the same construction as the teeth 38 illustrated in Fig. 5.

Referring now to Figs. 1 and 2, it will be seen that a combined, or unitary electric motor and traction-type fluid coupling unit is mounted on the cross beams 17 that form the top of the head portion of the screen frame. The electric motor is designated by the reference character 58. The traction-type fluid coupling is designated by the reference character 59. The detail features of construction of the fluid coupling 59 have not been fully illustrated because traction-type fluid couplings of desired construction are available on the open market. For example, Patent No. 2,240,270, issued to R. M. Schaefer, on April 29, 1941, fully discloses a fluid coupling that is suitable for use in this unitary assembly.

The output shaft 60 of the fluid coupling 59 is connected to the input shaft of a speed reducer gear unit 61 and functions to drive the gear train of this unit. The slow speed output shaft of the speed reducer unit 61 is provided with a drive sprocket 62 over which is trained the drive chain 63. Fig. 2 illustrates the drive sprocket 62 as being aligned with the drive chain sprocket rim 46 of the head shaft 22. Therefore, the drive chain 63 is trained over the drive chain sprocket rim 46. By this mechanism, the electric motor 58, when energized, will function to drive the two screen chain sprocket rims 37 and 57 through the medium of the fluid coupling 59, the speed reducer unit 61, the drive chain sprocket 62, the drive chain 63, the drive chain sprocket rim 46, and the torque tube 31. The fluid coupling 59 will function in the normal manner to provide cushioned starting, with the drive chain 63 and both screen chains 23 under tension, and positive protection against damaging overloads. The use of this fluid coupling, of course, completely overcomes the need for employing a shear or break pin at any point in the line of transmission of power from the electric motor 58 to the screen.

The full range of traveling water intake screens that are used industrially at this time require driving motors that range from one horsepower to five horsepower. By employing a fluid coupling of the same horsepower rating as the electric motor required, and by employing a starter switch for the electric motor, that is provided with a conventional thermal overload release (General Electric Company—A. C. Combination Magnetic Starter CR7008-A1), the drive will continue to apply driving force to the screen mechanism until the full stalling load is reached, or is applied to either one of the screen chains. The full load torque developed by the electric motor 58, which full load torque is approximately three times the rated horsepower of the motor, will be applied to the screen chains for a period of from thirty seconds to ninety seconds, while the fluid coupling is developing 100% slippage, before the thermal overload release mechanism of the starting switch will function to open the switch and break the supply of current to the electric motor. It will be appreciated, therefore, that this type of electric motor-fluid coupling drive will function very effectively to free either one or both of the screen chains in the event a log, or other floating object, jams the screen chains.

By employing the torque tube 31 for drivingly connecting the center disc 30 to the directly driven center disc 27, it will be appreciated that the head shaft 22 may be of the same diameter for the full range of screen sizes. To take care of intake water screens that vary in width from two feet to ten feet, it is only necessary to employ head shafts 22 and torque tubes 31 of the desired lengths. Because the same diametered head shaft is employed for the full range of water intake screens, the hubs 26 and 29 for the center discs 27 and 30 may be provided with the same bores for all screens.

By particularly considering the disclosure of Fig. 3, it will be seen that the driving force will be applied to the center disc 27 through its felly 36 to the screen chain sprocket rim 37. This driving force, also, will be delivered to the center disc 30 from the center disc 27 by the torque tube 31. Therefore, the driving force, for both screen chain rims, will be applied at a substantial distance from the axis of the head shaft 22. This drive assembly eliminates all torsional shear or deflection from the head shaft itself while the torque tube functions to reduce torsional deflection between the screen chain sprocket rims 37 and 57 and their center discs 27 and 30.

By employing sectional sprocket rims 37, 46 and 57, all of these rims can be located inboard of the bearings 21 and yet the rims can be replaced, when worn out, without breaking the drive chain 63 or either of the screen chains 23.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, we claim:

1. In a traveling water intake screen, the improvement which comprises a vertical frame having a head portion, two parallel screen chains, means carried by the lower portion of the frame for looping the screen chains, a pair of aligned bearings mounted on opposite sides of the frame head portion, a head shaft journaled at its ends in said bearings, a combined screen chain and drive chain sprocket on the head shaft inwardly of one of said bearings, a screen chain sprocket loose on the head shaft inwardly of the other bearing, and a torque tube for connecting the said screen chain sprocket with the said combined screen chain and drive chain sprocket, said parallel screen chains being trained over said screen chain sprockets.

2. In a traveling water intake screen, the improvement which comprises spaced vertical side frame members, axially aligned bearings supported by said frame members, a head shaft journaled at its ends in said bearings, a combined screen chain and drive chain sprocket keyed to the head shaft inwardly of one of said bearings, a screen chain sprocket loose on the head shaft inwardly of the other bearing, a torque tube concentric with the head shaft for driving the loose screen chain sprocket from the combined screen and drive chain sprocket, and drive means mounted on the said side frame members and including a drive chain trained over the drive chain portion of the combined sprocket.

3. In a traveling water intake screen, the improvement which comprises spaced vertical side frame members, axially aligned bearings supported by said frame members, a head shaft journaled at its ends in said bearings, a combined screen chain and drive chain sprocket keyed to the head shaft inwardly of one of said bearings, a screen chain sprocket loose on the head shaft inwardly of the other bearing, a torque tube concentric with the head shaft for driving the loose screen chain sprocket from the combined screen and drive chain sprocket, and drive means mounted on the said side frame members and including a drive chain trained over the drive chain portion of the combined sprocket, said combined screen and drive chain sprocket comprising a center disc having a hub keyed to the head shaft, a screen chain sprocket rim fastened to one face of the center disc, and a drive chain sprocket rim fastened to the opposite face of the center disc.

4. In a traveling water intake screen, the improvement which comprises spaced vertical side frame members, axially aligned bearings supported by said frame members, a head shaft journaled at its ends in said bearings, a combined screen chain and drive chain sprocket on the head shaft inwardly of one of said bearings, and a screen chain sprocket on the head shaft inwardly of the other bearing, said combined screen and drive chain sprocket comprising a center disc having a hub keyed to the head shaft, a multipart screen chain sprocket rim engaging one face of the center disc, a multipart drive chain sprocket rim engaging the opposite face of the center disc, and a plurality of fastening means passing through the center disc and the several parts of the screen and drive chain sprocket rims at suitable circumferentially spaced intervals to permit either rim to be replaced, one part at a time, without disturbing any of the parts of the other rim or the remaining part or parts of the rim being replaced and without cutting the chain for the rim being replaced.

5. In a traveling water intake screen, the improvement which comprises a head shaft, a disc keyed to the head shaft adjacent one end, a disc loose on the head shaft adjacent its other end, a torque tube enveloping the head shaft between and fastened at its ends to the keyed and loose discs to drivingly connect the same, a screen chain sprocket rim detachably connected to the inner side of each of said discs, and a drive chain sprocket rim detachably connected to the outer side of the keyed disc.

6. In a traveling water intake screen, the improvement which comprises a head shaft, a disc keyed to the head shaft adjacent one end, a disc loose on the head shaft adjacent its other end, a torque tube enveloping the head shaft between and fastened at its ends to the keyed and loose discs to drivingly connect the same, a screen chain sprocket rim positioned on the inner side of each of said discs, independent fastening means passing through both of said sprocket rims and their associated discs to connect the rims to the discs for separate detachment, a drive chain sprocket rim positioned on the outer side of the keyed disc, and fastening means passing through the drive chain sprocket rim and its disc to connect the rim to the disc for separate detachment.

7. In a traveling water intake screen, the improvement which comprises a head shaft, a disc keyed to the head shaft adjacent one end, a disc loose on the head shaft adjacent its other end, a screen chain sprocket rim positioned on the inner side of each of said discs, each of said sprocket rims being divided into several equal parts, independent fastening means passing through each part of both of said sprocket rims and their associated discs to connect the rim parts to the discs for separate detachment, a drive chain sprocket rim positioned on the outer side of the keyed disc, said latter rim being divided into several equal parts, and independent fastening means passing through each part of the drive chain sprocket rim and its associated disc and screen chain rim to connect the drive chain sprocket rim parts to their disc for separate detachment and to supplement the fastening means employed for connecting the associated screen chain sprocket rim to the disc.

8. In a traveling water intake screen, the improvement which comprises a screen head shaft, a center disc keyed to the head shaft, a drive chain sprocket rim, divided radially into two equal parts, detchably fastened to one side of the periphery of the center disc, a screen chain sprocket rim, divided radially into three equal parts, detachably fastened to the remaining side of the periphery of the center disc with one of its three points of division normal to the plane that passes through the two division points of the drive chain sprocket rim, a plurality of equi-spaced removable fastening devices passing through the parts of the screen chain rim and the center disc only, and a plurality of equi-spaced removable fastening devices passing through the center disc and the parts of both of the said rims at locations intermediate the first mentioned fastening devices.

9. In a traveling water intake screen, the improvement which comprises a screen head shaft, a center disc keyed to the head shaft, a drive chain sprocket rim, divided radially into two equal parts, detachably fastened to one side of the periphery of the center disc, a screen chain sprocket rim, divided radially into three equal parts, detachably fastened to the remaining side of the periphery of the center disc with one of its three points of division normal to the plane that passes through the two division points of the drive chain sprocket rim, each of the three parts of the screen chain sprocket rim having an axially projecting rib bearing against the peripheral surface of the center disc, a plurality of equi-spaced removable fastening devices passing through the parts of the screen chain rim and the center disc only, and a plurality of equi-spaced removable fastening devices passing through the center disc and the parts of both of the said rims at locations intermediate the first mentioned fastening devices.

10. In a traveling water intake screen, the improvement which comprises a screen head shaft, a center disc keyed to the head shaft, a drive chain sprocket rim, divided radially into two equal parts, detachably fastened to one side of the periphery of the center disc, a screen chain sprocket rim, divided radially into three equal parts, detachably fastened to the remaining side of the periphery of the center disc with one of its three points of division normal to the plane that passes through the two division points of the drive chain sprocket rim, a plurality of equi-spaced, headed bolts removably passing through the parts of the screen chain rim and the center disc only with the heads of the bolts recessed in the side of the center disc opposite the screen chain rim, a plurality of equi-spaced, headed bolts removably passing through the screen chain rim parts, the center disc and the drive chain sprocket rim parts with the heads of the bolts located on the outer side of the screen chain sprocket rim, and a nut threaded on the remaining end of each bolt.

11. In a traveling water intake screen, the improvement which comprises a screen head shaft, a center disc keyed to the head shaft, a drive chain sprocket rim, divided radially into two equal parts, detachably fastened to one side of the periphery of the center disc, a screen chain sprocket rim, divided radially into three equal parts, detachably fastened to the remaining side of the periphery of the center disc with one of its three points of division normal to the plane that passes through the two division points of the drive chain sprocket rim, each of the three parts of the screen chain sprocket rim having an axially projecting rib bearing against the peripheral surface of the center disc, a plurality of equi-spaced, headed bolts removably passing through the parts of the screen chain rim and the center disc only with the heads of the bolts recessed in the side of the center disc opposite the screen chain rim, a plurality of equi-spaced, headed bolts removably passing through the screen chain rim parts, the center disc and the drive chain sprocket rim parts with the heads of the bolts located on the outer side of the screen chain sprocket rim, and a nut threaded on the remaining end of each bolt.

12. In a traveling water intake screen, the improvement which comprises spaced vertical supports, axially aligned bearings mounted on said supports, a head shaft journaled at its ends in said bearings, a combined screen chain and drive chain sprocket keyed to the head shaft inwardly of one of said bearings, a screen chain sprocket loose on the head shaft inwardly of the other bearing, and a torque tube concentric with the head shaft for driving the loose screen chain sprocket from the combined screen chain and drive chain sprocket.

13. In a traveling water intake screen, the improvement which comprises spaced vertical supports, axially aligned bearings mounted on said supports, a head shaft journaled at its ends in said bearings, a center disc having its hub keyed to the head shaft inwardly of one of said bearings, a screen chain sprocket rim detachably fastened to the inner face of said center disc, a drive chain sprocket rim detachably fastened to the outer face of said center disc, a second center disc having its hub loosely mounted on the head shaft inwardly of the other bearing, a screen chain sprocket rim detachably fastened to the inner face of said second center disc, and a torque tube concentric with the head shaft for driving the loose second center disc, with its sprocket rim, from the first mentioned center disc.

14. In a traveling water intake screen, the improvement which comprises spaced vertical supports, axially aligned bearings mounted on said supports, a head shaft journaled at its ends in said bearings, a center disc having its hub keyed to the head shaft inwardly of one of said berings, a sectional screen chain sprocket rim detachably fastened to the inner face of said center disc, a sectional drive chain sprocket rim detachably fastened to the outer face of said center disc, a second center disc having its hub loosely mounted on the head shaft inwardly of the other bearing, a sectional screen chain sprocket rim detachably fastened to the inner face of said second center disc, and a torque tube concentric with the head shaft for driving the loose second center disc, with its sprocket rim, from the first mentioned center disc.

15. In a traveling water intake screen, the improvement which comprises spaced vertical supports, axially aligned bearings mounted on said supports, a head shaft journaled at its ends in said bearings, a center disc having its hub keyed to the head shaft inwardly of one of said bearings, a screen chain sprocket rim detachably fastened to the inner face of said center disc, a drive chain sprocket rim detachably fastened to the outer face of said center disc, a second center disc having its hub loosely mounted on the head shaft inwardly of the other bearing, a screen chain sprocket rim detachably fastened to the inner face of said second center disc, a torque tube concentric with the head shaft for driving the loose second center disc, with its sprocket rim, from the first mentioned center disc, and drive means mounted on the said vertical supports and including a drive chain trained over the said drive chain sprocket rim.

16. In a traveling water intake screen, the improvement which comprises spaced vertical supports, axially aligned bearings mounted on said supports, a head shaft journaled at its ends in said bearings, a center disc having its hub keyed to the head shaft inwardly of one of said bearings, a sectional screen chain sprocket rim detachably fastened to the inner face of said center disc, a sectional drive chain sprocket rim detachably fastened to the outer face of said center disc, a second center disc having its hub loosely mounted on the head shaft inwardly of the other bearing, a sectional screen chain sprocket rim detachably fastened to the inner face of said second center disc, a torque tube concentric with the head shaft for driving the loose second center disc, with its sprocket rim, from the first mentioned center disc, and drive means mounted on the said vertical supports and including a drive chain trained over the said drive chain sprocket rim.

17. In a traveling water intake screen, the improvement which comprises a head shaft, a disc keyed to the head shaft adjacent one end, a disc loose on the head shaft adjacent its other end, a torque tube enveloping the head shaft between and fastened at its ends to the keyed and loose discs to drivingly connect the same, a screen chain sprocket rim fastened to the inner side of each of said discs, a drive chain sprocket rim detachably fastened to the outer side of the keyed disc, and drive means including a drive chain trained over the drive chain sprocket rim.

18. In a traveling water intake screen, the improvement which comprises a head shaft, a disc keyed to the head shaft adjacent one end, a disc loose on the head shaft adjacent its other end, a torque tube enveloping the head shaft between and fastened at its ends to the keyed and loose discs to drivingly connect the same, a sectional screen chain sprocket rim detachably fastened to the inner side of each of said discs, a sectional drive chain sprocket rim detachably fastened to the outer side of the keyed disc, and drive means including a drive chain trained over the drive chain sprocket rim.

19. In a traveling water intake screen, the improvement which comprises spaced vertical supports, axially aligned bearings mounted on said supports, a head shaft journaled at its ends in said bearings, a center disc formed with a peripheral felly and having its hub keyed to the head shaft inwardly of one of said bearings, a screen chain sprocket rim detachably fastened to the inner side of the felly of said center disc, a drive chain sprocket rim detachably fastened to the outer side of the felly of said center disc, a second center disc formed with a peripheral felly and having its hub loosely mounted on the head shaft inwardly of the other bearing, a screen chain sprocket rim detachably fastened to the inner side of the felly of said second center disc, a torque tube concentric with and enveloping the head shaft between the keyed and loose center discs, and means for fastening the ends of the torque tube to the two center discs at locations substantially midway between the hubs and fellies of said discs.

20. In a traveling water intake screen, the improvement which comprises spaced vertical supports, axially aligned bearings mounted on said supports, a head shaft journaled at its ends in said bearings, a center disc formed with a peripheral felly and having its hub keyed to the head shaft inwardly of one of said bearings, a sectional screen chain sprocket rim detachably fastened to the inner side of the felly of said center disc, a sectional drive chain sprocket rim detachably fastened to the outer side of the felly of said center disc, a second center disc formed with a peripheral felly and having its hub loosely mounted on the head shaft inwardly of the other bearing, a sectional screen chain sprocket rim detachably fastened to the inner side of the felly of said second center disc, a torque tube concentric with an enveloping the head shaft between the keyed and loose center disc, and means for fastening the ends of the torque tube to the two center discs at locations substantially midway between the hubs and fellies of said discs.

RICHARD F. BERGMANN.
ROBERT W. SUMAN.
HAROLD F. WATSON.

REFERENCES CITED

The following references are of record in the file of this patent:

UNITED STATES PATENTS

| Number | Name | Date |
|---|---|---|
| 826,757 | Waterfield | July 24, 1906 |
| 1,874,736 | Bleyer | Aug. 30, 1932 |

FOREIGN PATENTS

| Number | Country | Date |
|---|---|---|
| 17,089 | Great Britain | 1896 |
| 835,262 | France | Sept. 19, 1938 |